United States Patent
Yaniv et al.

(10) Patent No.: US 7,560,134 B2
(45) Date of Patent: Jul. 14, 2009

(54) NANOPARTICLE IMPLANTATION

(75) Inventors: Zvi Yaniv, Austin, TX (US); Richard Lee Fink, Austin, TX (US); Mohshi Yang, Austin, TX (US)

(73) Assignee: Applied Nanotech Holdings, Inc., Austin, TX (US)

( * ) Notice: Subject to any disclaimer, the term of this patent is extended or adjusted under 35 U.S.C. 154(b) by 0 days.

(21) Appl. No.: 11/570,912

(22) PCT Filed: Jun. 28, 2005

(86) PCT No.: PCT/US2005/022671

§ 371 (c)(1),
(2), (4) Date: Mar. 1, 2007

(87) PCT Pub. No.: WO2007/013871

PCT Pub. Date: Feb. 1, 2007

(65) Prior Publication Data

US 2008/0193634 A1    Aug. 14, 2008

Related U.S. Application Data

(60) Provisional application No. 60/583,681, filed on Jun. 29, 2004.

(51) Int. Cl.
B05D 5/06 (2006.01)
B05D 5/12 (2006.01)
B05D 1/12 (2006.01)
B05D 7/00 (2006.01)

(52) U.S. Cl. .......................... 427/77; 427/201; 427/212; 427/215; 427/220; 427/222; 427/427; 427/427.5; 427/427.6; 427/427.7

(58) Field of Classification Search ................. 427/201, 427/77, 212, 215, 220, 222, 421.1–427.7
See application file for complete search history.

(56) References Cited

U.S. PATENT DOCUMENTS

2001/0024086 A1* 9/2001 Fox et al. .................... 313/495
2003/0102099 A1* 6/2003 Yadav et al. ................ 162/208
2004/0092050 A1* 5/2004 Shuy et al. .................... 438/20

OTHER PUBLICATIONS

Definition of "implant" from www.dictionary.com.*

* cited by examiner

Primary Examiner—Timothy H Meeks
Assistant Examiner—Jimmy Lin
(74) Attorney, Agent, or Firm—Fish & Richardson P.C.; Kelly Kordzik

(57) ABSTRACT

A method for forming a coating of nano-sized material on the surface of another material using a micromachining bead-blasting machine for implantation of nanoparticles is disclosed. The method can be practiced with a wide range of target materials, nanoparticles (such as carbon-nanotubes, CNTs), and environmental conditions, using a wide range of carrier bead sizes and materials, or without carrier beads. The claimed implantation method can be used to fabricate a surface-activated CNT-cathode for use in a field emission device. The implantation method can also be used for chemically reacting any of the materials present near the point of impact with each other.

17 Claims, 4 Drawing Sheets

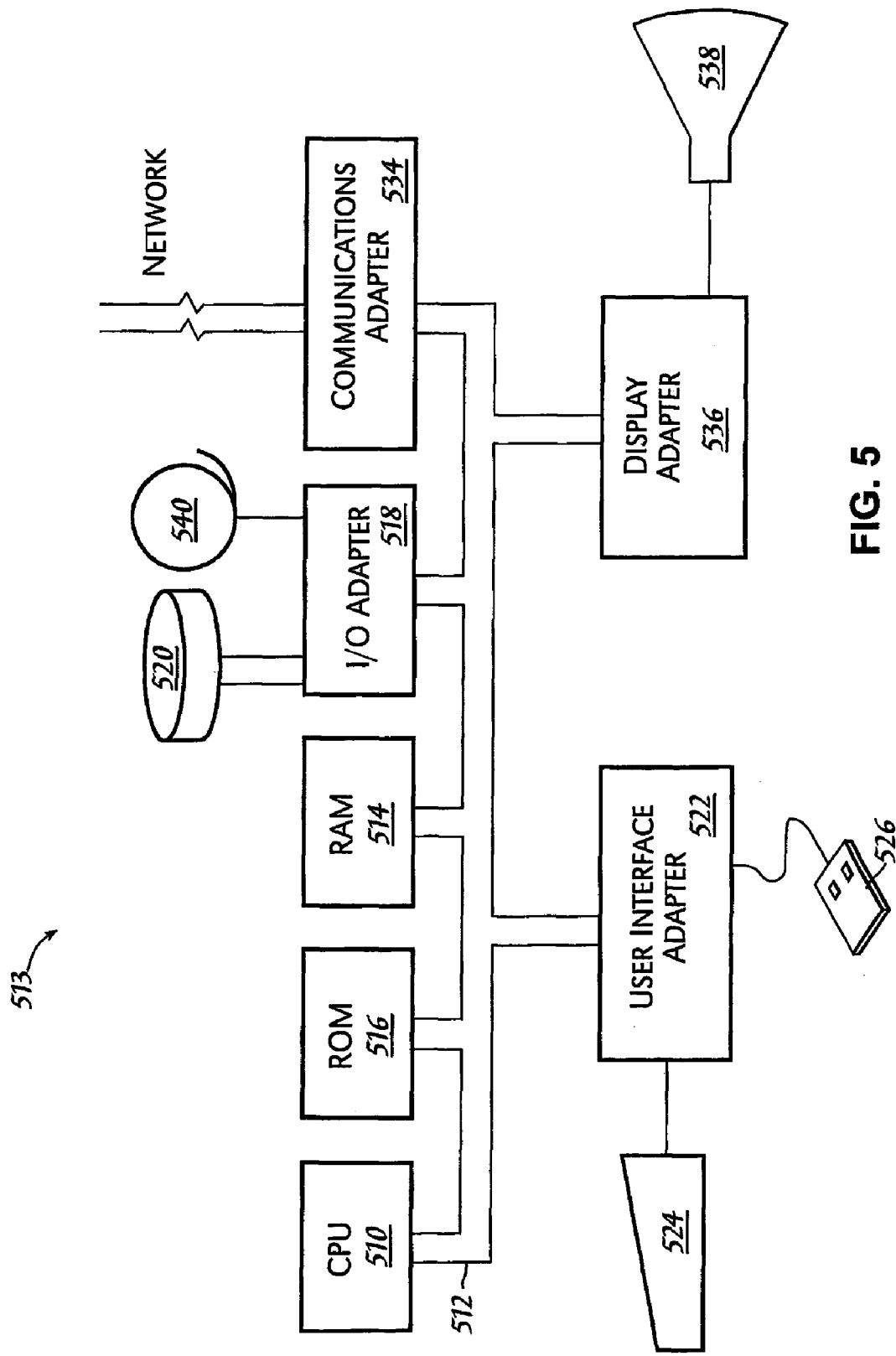

__NANOPARTICLE IMPLANTATION__

CROSS-REFERENCE TO RELATED APPLICATIONS

This application is the national stage of International Application PCT/US2005/022671, filed Jun. 28, 2005, which claims priority to U.S. Provisional Application 60/583,681, filed Jun. 29, 2004.

TECHNICAL FIELD

The present invention relates in general to material coatings, and in particular, to forming a coating of nano-sized material on the surface of another material.

BACKGROUND INFORMATION

There is a critical need in many coating applications to form a coating of nano-sized material on the surface of another material. In one example, magnetic recording needs a coating of magnetic material where the grain size of the magnetic domains is on the order of nanometers in order to achieve higher density magnetic recording. In one example, catalysts require coatings of nano-sized grains in order to achieve the higher surface area to increase chemical reaction rates and reduce costs of the catalytic material. In one example, optical coatings of nano-sized grains will be optically transparent because light in the visible range will scatter very weakly from these grains. These optical coatings can be used to improve the scratch resistance and erosion resistance of the optical surface as well as other parameters, yet maintain optical transparency. In one example, cathodes using carbon nanotube (CNT) emitters require a coating of carbon-nanotubes that have diameters of a few nanometers. The CNTs should be firmly bonded to the substrate to prevent them from dislodging and creating electrical shorts or other problems in a device such as a display that uses the CNTs as electron sources. Printing pastes that contain CNTs are solutions to this need but require more CNT than is necessary, much of the CNT material in the paste composite is buried in the paste and is not available at the emission surface. Often these paste composites require post-deposition processes to activate the material for field emission. Eliminating the need for this process would be an advantage.

Since the need for these coatings spans over a large set of materials and applications, there is a need for making these coatings using a technique that is compatible with many different materials.

SUMMARY OF THE INVENTION

The present invention addresses the foregoing need by providing a method and apparatus for coating nanoparticles onto the surface of a host material by means of implanting the nanoparticles into the surface of the host material. The nanoparticles can be any material that has a dimension of size in the range of 0.1 nm to 100 nm, including carbon-nanotubes (CNTs) and carbon fullerenes (C60, C70). The host material can also be from a broad range of materials, including insulators, semiconductors, and conductors. The host material can be compounds, glasses, alloys, polymers, mixtures of any of these materials, or consist of a single element.

A method of implantation utilizes a high-precision micromachining bead-blaster to embed the nanoparticles into the surface of the host material. The nanoparticles can be premixed with carrier beads for subsequent implantation onto the host surface. A method of the present invention can also be used to coat the nanoparticles onto the surface of beads or other larger particles. This method of implantation can result in the chemical bonding of the nanoparticles with the host material.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates a data processing system;

DETAILED DESCRIPTION

Figure 1:
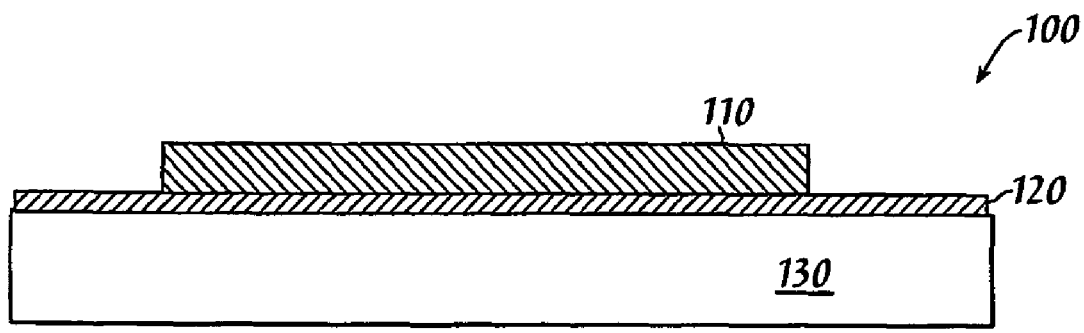
FIG. 1 illustrates a configuration of one sample used for coating by CNT implantation.

In the following description, numerous specific details are set forth such as specific substrate materials to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention provides a method and apparatus for coating nanoparticles onto the surface of a host material by means of implanting the nanoparticles into the surface of the host material. The nanoparticles can be any material that has a dimension of size in the range of 0.1 nm to 100 nm. For example, nanoparticles can be grains of alumina ($Al_2O_3$), silica ($SiO_2$) or other insulator, semiconductor or conductor material, including metal material. The nanoparticle material can be compounds, alloys, polymers, or mixtures of all of these materials, or made up of a single element such as carbon. Carbon-nanotubes (CNTs) are also included in this list of materials because the diameters of the nanotubes are on the order of 1 nm for single wall nanotubes (SWNTs) to as large as 100 nm for some thick multi-wall nanotubes (MWNTs). Carbon fullerenes such as C60 or C70 are also included on this list of nanoparticles.

The host material can also be from a broad range of materials, including insulators, semiconductors, and conductors. The host material can be compounds, glasses, alloys, polymers, mixtures of any of these materials, or consist of a single element.

The method of implantation utilizes a high-precision micromachining blaster (Alps BSP-20) to embed the nanoparticles into the surface of the host material. The nanoparticles can be premixed with carrier beads for subsequent implantation on to the host surface. The method of the present invention can also be used to coat the nanoparticles onto the surface of beads or other larger particles. This method of implantation can result in the chemical bonding of the nanoparticles with the host material.

In one embodiment 200 of the current invention, SWNTs (single wall CNTs) were implanted into a soft, conducting paste material using a standard bead-blasting machine. The conducting paste layer 110 was prepared by mixing the following ingredients: amorphous carbon powder, frit vehicle and glass frit. The recipe for making the paste is given as: carbon powder, 5-25%; vehicle, 50-90%; and glass frit 5-25%. A wide range of CNT pastes are possible. Vehicle material acts as the carrier for the powders in the paste and is composed of both volatile (solvents) and non-volatile (polymers) organics. Thinner (Terpineol, Dupont 8250) was added to adjust the viscosity of the paste. The mixture was initially ground and mixed with a mortar and pestle and then transferred to a mechanical stirrer to stir the mixture for 3 hours. The mixture was then transferred to a three-roll mill to further homogenize the paste. There are many variations on making the CNT paste used by those that practice the art.

The paste was printed onto a glass substrate 130 with a conducting layer of indium tin oxide (ITO) 120 on the glass. ITO is common in the art as an optically transparent electrode material. The ITO layer 120 is not necessary or critical. Standard screen printing techniques were used to print the paste onto the ITO-coated glass substrates using a 355-mesh screen. After printing, no oven drying or curing steps need be performed before implantation. The implantations were completed within 4 hours of printing in order to keep the paste soft. The invention may be practiced using different paste and process recipes.

FIG. 1 shows the configuration of a sample 100 containing a conductive paste layer 110 prepared according to this process which was used for the CNT implantation. The sample 100 was used as the implantation target for coating with CNTs, and included the glass substrate 130, the ITO layer 120 and the printed conducting paste layer 110, which was the actual host material.

The CNT implantation material was prepared by mixing 1-3 grams of single wall CNT (SWNT) 230 material from Iljin Nanotech Co., Korea, with 2000 grams of glass beads of 30 micron diameter and processing in a ball mill in dry form for 4 hours. Other single wall, double wall, or multi-wall material may also be used. In this case, the glass beads were used as a carrier material to help transport the CNTs (SWNTs) to the substrate. The beads also play a role in the implantation process. Other diameters of glass beads can also be used, typically ranging from 1 micron to 100 micron. Carrier beads of diameter 10-30 microns were found very effective in transporting the CNT implantation material.

The material of the carrier particles need not be glass, but can be silica ($SiO_2$), alumina ($Al_2O_3$), plastic or polymer, or other conducting, semiconducting or insulating particle, including other carbon materials. The carrier particles can also be made of ice (frozen water) or dry ice (frozen carbon dioxide particles) or other materials that may evaporate or melt soon after the implantation process.

After the dry mixture of CNT (SWNT) and glass beads were processed, the mixture was loaded into an Alps Micro Blast BSP-20 machine. Other sand-blasting or bead-blasting equipment may also be used to practice the invention. Four ITO-glass samples (M-1, M-2, M-3, M-4) were prepared with printed amorphous carbon powder paste in 3×3 $cm^2$ area. One was for a control; others were blasted by CNT-mixed glass beads with various conditions listed in Table 1 (shown below).

Figure 2:
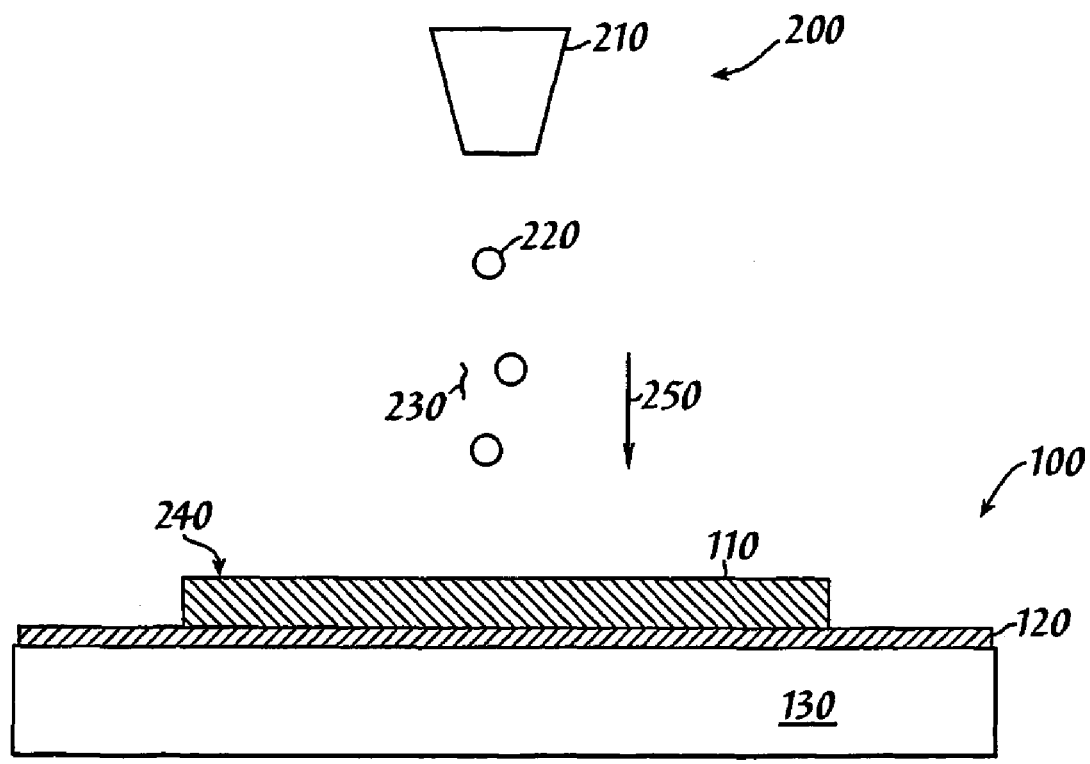
FIG. 2 illustrates an apparatus used to practice an embodiment of the present invention.

FIG. 2 illustrates a characterization of the implantation process in one embodiment 200 of the present invention. Both or either the target surface 100 or the nozzle 210 attached to the bead-blasting gun (not shown) can move in either direction horizontally, in a programmed pattern to treat the sample uniformly, or in a specific pattern as desired. A mask (not shown) can also be placed between the target surface 100 and the nozzle 210 such that the glass carrier beads 220 treat certain areas and not other areas. The nozzle 210 in FIG. 2 is pointing down 250, perpendicular to the substrate. In fact, the nozzle 210 and the direction of the beads 250 can be from any direction that is accessible to the treated surface 240. Note that certain CNTs 230 may be implanted even though they do not adhere to a carrier bead 220.

The most plausible implantation mechanism is that most of the CNT material is carried to the surface of the paste by the glass carrier beads 220. The CNTs can adhere to the surface of the glass carrier beads 220 by Van der Walls forces, electrostatic interaction, or other forces. An adhesive coating may additionally be used on the glass carrier beads 220. The CNTs 230 may also be carried along by the same air blast that pushes the beads to the substrate and directly become implanted in the host surface.

Figure 3:
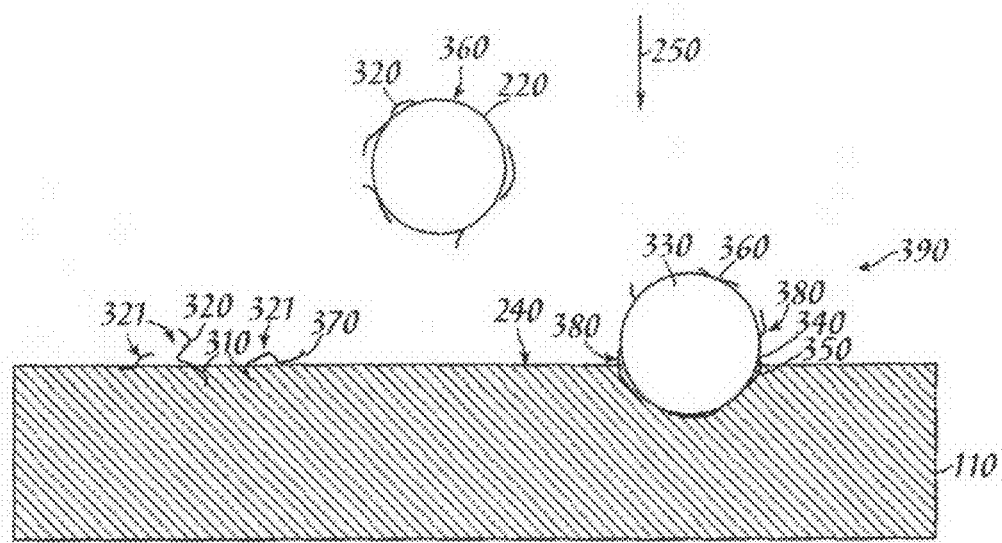
FIG. 3 illustrates an example of the present invention with a side view of glass carrier beads coated with CNTs immediately before and after striking a target surface.

FIG. 3 illustrates the details of the interaction of a glass carrier bead 220 striking the target surface 240 of the host material 110. When the carrier beads 220 strike the surface 240, some of the nanoparticle material, in this case CNTs 320, that adheres to the surface 360 of the carrier beads 220 can be transferred to the treated surface 240. The energy at which the carrier beads 220 strike the surface 240 in the direction of impact 250 can cause local denting or deformation of the surface 240. In FIG. 3, the surface 240 is illustrated with a smooth line for clarity, but in reality it can be very rough. The impact of the carrier bead 220 may also roughen the surface. CNTs 321 may be left on the surface 240 after string the surface 240. A CNT 321 that has been implanted or embedded to form a coating on the treated surface 240 may have some portion of the CNT 310 inserted below the surface 240 and another portion of the CNT 370 exposed outside the surface 240.

In one example 390 of the current embodiment of the present invention, the carrier beads 220 used to carry the CNTs 320 may stay embedded on the surface 240. The CNTs 360, 380 on such an embedded carrier bead 330 may still remain in proximity to the bead 330, some CNTs 360 on top of the bead 330, some CNTs completely embedded between the bead 330 and the treated surface 240, and some CNTs 380 partially embedded between the bead 330 and the treated surface 240, with an inserted portion if the CNT 350 embedded in the host material 110 and an exposed portion of the CNT 340 outside the surface 240. This form of implantation is also one example of an embodiment of the present invention.

There may be many mechanisms that capture the nanoparticle 320, 321, 380 on impact. The act of deformation of the surface 240 will cause the temperature to increase locally at the deformation site, possibly to high temperatures, if for only a brief moment. The act of deformation and the high local, instantaneous heating will capture some of the nanoparticle material 320, 321, 380 on the beads 220, 330 into the treated surface 240. Possibly the target surface 240 of the host material 110 is porous or rough before the bead 220, 330 strikes the surface 240. The nanoparticles 320, 321, 380 can be at least partially captured in the cracks or pores on the surface 240 which are then closed during the impact event. In one example of an embodiment of the present invention, as illustrated in FIGS. 1-3, the printed conducting paste 110 contains particles in an organic binder solution that is still soft. The nanoparticles 320, 230 can easily strike the paste 110 and be captured by the organic binder acting as a mild adhesive.

It should be noted that all of the process steps described in the implantation method 200 above can be performed at room temperature in a normal atmospheric environment, which is advantageous over many other techniques for coating materials. For more specialized coating applications, other embodiments of the present invention may be practiced at higher or lower temperatures, in a vacuum, at higher pressures of any mixture of environmental gases, or in the absence of gravity.

After implantation 200 as illustrated in FIG. 2, the substrate can be dried and cured using standard processes known to those skilled in the art of screen printing glass frits. Nitrogen gas is flowed through the oven during the high temperature curing process in order to preserve the CNT 320, 321, 380 material that has been embedded into the surface 240 of the printed conducting paste 110. Other variations and combinations of processing steps can be used to dry and cure the paste 110 containing CNTs 320, 321, 380 implanted on the surface 240.

TABLE 1

| sample # | sand density (rpm) | Air pressure (psi) | Field (V/um) @ 30 mA | Comments |
|---|---|---|---|---|
| M-1 | n/a | n/a | no emission | Control |
| M-2 | 100 | 4.2 | 3.0 | Implantation process |
| M-3 | 100 | 12.6 | 3.0 | Implantation process |
| M-4 | 30 | 12.6 | 3.2 | Implantation process |

Table 1 shows the process parameters of one embodiment 200 of the present invention described above. Table 1 contains data for samples used in one embodiment of the present invention having a soft conducting paste as the target material. Table 1 also indicates the results of field emission performed in a diode mode using four samples (M-1, M-2, M-3, M-4) generated in one embodiment 200 of the present invention. The rate at which the glass bead sand was fed into the nozzle 210 during implantation 200 is controlled and reported in the column marked "sand density" recorded in units of revolutions per minute (rpm). The air pressure of the bead-blast machine is also noted in pounds per square inch (psi).

Figure 4:
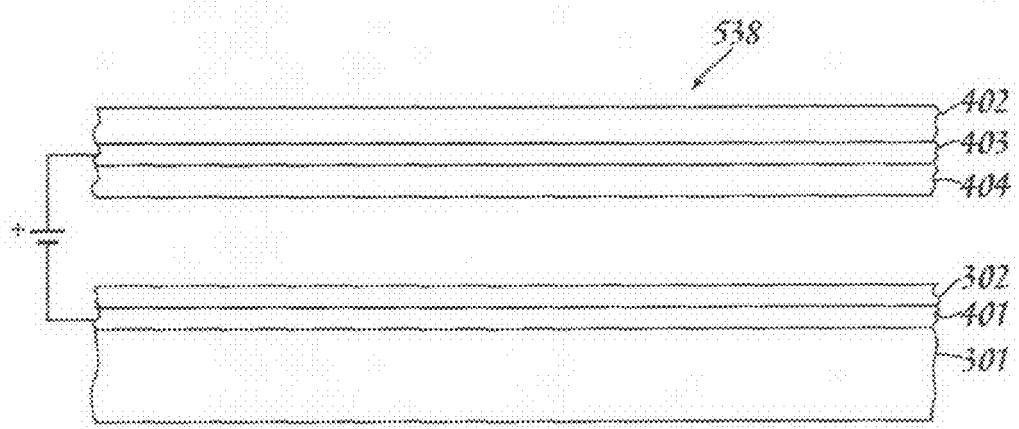
FIG. 4 illustrates a a portion of a field emission display made using a cathode in a diode configuration.

The field emission results were obtained with each sample mounted in a diode configuration with a phosphor anode 404 as one electrode, and the target surface 100 cathode as the other electrode 302 as in FIG. 4. The anode 403, 404 was at ground potential. A pulsed bias was placed on the cathode 401, 302 such that electrons from the cathode could be extracted and accelerated to the anode to create light as a result of an electric field between the cathode and anode electrodes. Recorded on the table is the electric field required to generate 30 mA of current from the 3×3 $cm^2$ treated surface. One sample, M-1, was not implanted with nanoparticles and served as a control sample. The control sample M-1 did not show field emission of electrons when used as a cathode. Field emission was observed in samples M-2, M-3, and M-4 used as cathodes after implantation 200 with subsequent drying and curing of the conducting paste 110, indicating that CNTs 320, 321, 380 were transferred to these samples in this embodiment of the present invention described above.

Figure 6:
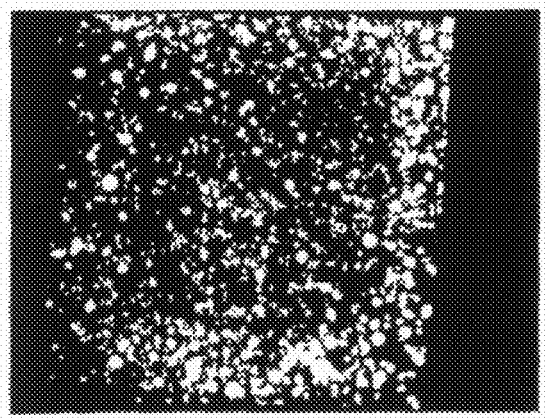
FIG. 6 is a photograph of an image on a phosphor screen taken during field emission of a sample implanted with CNTs according to an embodiment of the present invention.

FIG. 6 is a photograph of an image of the phosphor screen taken during the diode emission of sample M-2 in one embodiment of the present invention.

After the implantation process 200 with subsequent drying and curing of the conducting paste 110, an adhesive tape was applied to the surface of the implanted samples M-2, M-3, and M-4 and then removed. Removing the tape did remove some of the CNTs 321, 380, but not all, indicating that some of the CNTs 321, 380 are embedded or implanted into the paste material with significant bonding energy by the method claimed in the present invention. The field emission threshold increased only slightly from 3.0 V/micron to 3.1 V/micron and the uniformity also improved slightly after applying and removing the tape. The control sample M-1 was also submitted to the adhesive tape process. After this process, the threshold field improved but was still very poor compared to the implantation-treated samples M-2, M-3, and M-4.

The present invention can be practiced with other target materials to implant CNTs or other nanoparticles onto. In one embodiment of the present invention, an adhesive copper tape, a tape with a copper foil or film on one side and an adhesive on the other side, was used as the target surface host material. Other metals may be used as well such as brass, bronze, silver, gold, etc. The adhesive backing is not needed, but was convenient to affix the copper film or foil to a substrate. This can be a method of coating a soft, low temperature metal like silver with a hard, scratch resistant coating or a coating to inhibit tarnishing or corrosion. CNTs were again implanted in one embodiment of the present invention, but other materials may be used as well, including other forms of carbon such as carbon black, amorphous carbon, or carbon fullerenes.

As in the previous embodiment, CNTs 320 were mixed with glass beads 220 as described above. The copper tape was treated by the CNT-coated glass beads 220 as described above. The copper side of the tape was implanted with CNTs, the adhesive side was attached to a substrate. The parameters of this embodiment of the present invention are given Table 2.

TABLE 2

| sample # | sand density (rpm) | air pressure (psi) | Field (V/um) @ 30 mA | carbon density per cm square | Comments |
|---|---|---|---|---|---|
| M-5 | 100 | 4.2 | 4.2 | 10000 | Implantation process |
| M-6 | 100 | 12.6 | 4.2 | 10000 | Implantation process |

Table 2 contains data for samples used in one embodiment of the present invention having copper tape as the target material. No beads 220 were found embedded in the copper surface after the implantation, but the samples M-5 and M-6 did have many dents and pock marks resulting from the bead-blasting process. The CNT particles that remained on the copper surface of the tape were transferred from the glass bead 220 to the copper surface during the implantation process disclosed in the present invention.

After implantation, field emission results were obtained with the copper tape in a diode configuration with a phosphor anode as one electrode and the copper tape cathode as the other electrode. A control sample of copper tape which was not subjected to CNT implantation as described above had much higher extraction fields than the CNT-implanted samples M-5 and M-6.

After the implantation process, the copper tape sample was also submitted to the adhesive tape process described above, by applying an adhesive tape to the CNT-implanted copper surface and then removing the tape. Removing the tape did remove some of the CNTs, but not all, indicating that some of the CNTs were embedded or implanted into the copper material with significant bonding energy by the method claimed in the present invention. After the adhesive tape process, the samples were once again used as cathodes for field emission as described above. The threshold field (as defined as the field needed to achieve 30 mA of current) increased from 3.0 V/micron to 6.0 V/micron.

Figure 7:
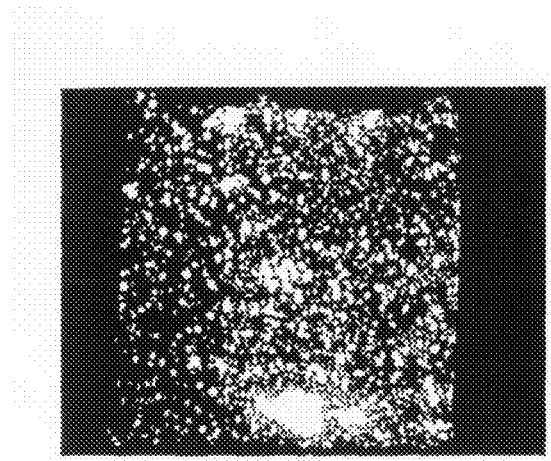
FIG. 7 is a photograph of an image on a phosphor screen taken during field emission of a sample implanted with CNTs according to an embodiment of the present invention.

FIG. 7 is a photograph of an image of the phosphor screen taken during the diode emission of sample M-5 in one embodiment of the present invention.

Figure 8:
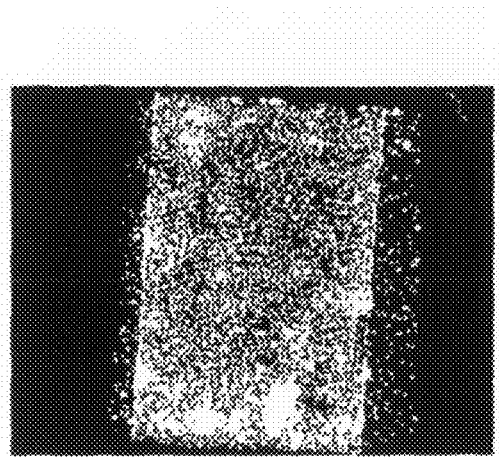
FIG. 8 is a photograph of an image on a phosphor screen taken during field emission of a sample implanted with CNTs according to an embodiment of the present invention, after treating the surface with adhesive tape.

FIG. 8 is a photograph of an image of the phosphor screen taken during the diode emission of sample M-5, after the adhesive tape process, in one embodiment of the present invention. The operating fields were much higher than before the adhesive tape process, but the image exhibits improved and more uniform luminosity.

The method of the present invention can also be practiced to embed or implant nanoparticles onto the surface of beads or other larger particles. In one embodiment of the present invention, CNTs or other nanoparticle material can be mixed with glass beads 220 or other larger carrier material and performing the bead-blasting treatment 200 as described above, only a harder target was used. The target is often harder than the bead, but this may not be necessary. If the carrier bead is softer than the target material, the nanoparticle can be preferentially implanted or embedded into the bead, rather than onto the target surface, upon impact. This is a way of coating a soft, low-temperature bead with a hard, high-temperature coating and avoiding high-temperature processes that will melt the bead. In one example of an embodiment of the present invention polymer beads are used to implant alumina ($Al_2O_3$) nanoparticles onto a hard target surface, such as sapphire or quartz.

In one embodiment of the present invention, the nanoparticles will chemically react with the target surface or with the bead surface upon impact of the carrier bead on the target surface. One example of an embodiment of the present invention is iron carbides, nickel carbides, titanium carbides, or chromium carbides which may be formed on the surface of stainless steel as a result of practicing the method of the present invention. In one example of an embodiment of the present invention, a hard or corrosion-resistive coating can be chemically formed onto a target surface material.

The practice of this embodiment of the present invention is not limited to the nanotube form of carbon; carbon graphite flakes, or carbon fullerenes may be used in place of the CNTs to chemically react with the target surface. Not all of the nanoparticle material may remain on the target surface, rather only the part of the nanoparticle material that is consumed during the chemical reaction remains on the target surface. The rest of the nanoparticle may remain in or on the target surface, become partially embedded in the target surface material, or may not remain on the surface at all.

In one example of an embodiment of the present invention, a stainless steel sheet was bombarded with CNT-coated glass beads. The stainless steel sheet turned dark after carbon remained on the surface as a result of practicing this example of the present invention. The carbon was able to react with the nickel, iron, chromium or other materials in the stainless steel. CNTs may also be embedded or implanted into the surface of the stainless steel by practicing this example of the present invention.

Figure 9:
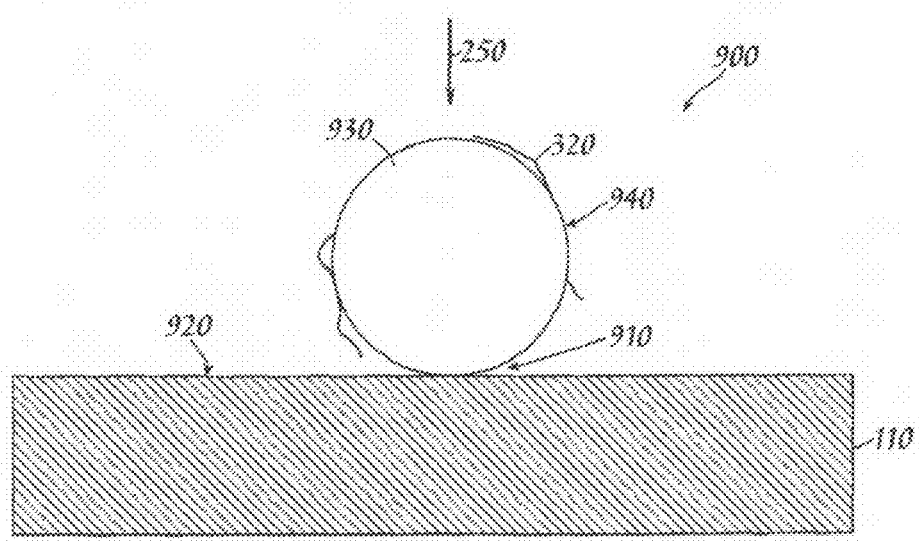
FIG. 9 illustrates a chemical reaction as a result of the impact of a carrier bead coated with CNTs and a target surface.

FIG. 9 illustrates the chemical reaction 900 at the surface of a target material as a result of the impact of a carrier bead premixed with CNTs. The carrier beads 930 strike the target surface 920 with a high velocity in the direction 250 of the target surface 920. CNTs 320 adhere to the surface 940 of the carrier bead 930. Upon collision 910 of the carrier bead 930 with the target surface 920, there is a chemical reaction due to high local temperature, high local pressure, and/or deformation at the point of impact.

In one example of this embodiment of the present invention, different forms or kinds of nanoparticles are mixed together with the beads. During impact 910 of the carrier bead 930 with the surface 920, temperatures and pressures may locally reach extreme values, if only for an instant, but long enough to react the mixed nanoparticles with each other and/or with the bead surface 940. One advantage of the bead-blasting method in the present invention over the mechanochemical processing in a ball mill, with large balls and powders of nanomaterials, is that in bead-blasting, exact control of the energy of the particle striking the surface may be exercised while that energy can be much higher.

In one embodiment of the present invention, the implantation or embedding process of the nanoparticles is performed without requiring a carrier bead, such as the glass bead mentioned above. In one example of this embodiment of the present invention, carbon-nanotubes can be implanted into paste or copper foil without using a carrier bead but still using the Microblast BSP-20. Only carbon-nanotubes are loaded in the feeder hopper of the machine without any carrier beads. The target samples indicated in Table 3 were implanted with CNTs in this manner, without using carrier beads, and included copper tape/foil substrates and graphite paste host materials, as described in abovementioned embodiments of the present invention.

Field emission using the target samples, which were implanted with CNTs without using carrier beads, as a cathode was performed as described in above-mentioned embodiments of the present invention. All of the samples in this embodiment of the present invention have very low threshold fields (<2.5/micron to extract 30 mA of current). Then the adhesive tape process was applied to these samples as described in above-mentioned embodiments of the present invention. The field emission threshold increased after the tape was removed, but not dramatically. Emission site density did improve noticeably after tape activation. Table 3 contains data on samples used in one embodiment of the present invention without carrier beads.

TABLE 3

| sample # | layer structure | Material feed density (rpm) | Air pressure (psi) | Field (V/um @ 30 mA) | Comments |
|---|---|---|---|---|---|
| cu-3 | copper foil | 25 | 1.4 | 2.1 | |
| cu-4 | copper foil | 25 | 4.2 | 1.6 | |
| G3-d | graphite paste | 25 | 1.4 | 2.3 | |
| G2-e | graphite paste | 25 | 4.2 | na | film peeled |

FIG. 4 illustrates a portion of a field emission display 538 made using a cathode in a diode configuration, such as created above. Included with the cathode is a conductive layer 401. The anode may be comprised of a glass substrate 402, and indium tin layer 403, and a cathodoluminescent layer 404. An electrical field is set up between the anode and the cathode. Such a display 538 could be utilized within a data processing system 513, such as illustrated with respect to FIG. 5.

A representative hardware environment for practicing the present invention is depicted in FIG. 5, which illustrates an exemplary hardware configuration of data processing system 513 in accordance with the subject invention having central processing unit (CPU) 510, such as a conventional microprocessor, and a number of other units interconnected via system bus 512. Data processing system 513 includes random access memory (RAM) 514, read only memory (ROM) 516, and input/output (I/O) adapter 518 for connecting peripheral devices such as disk units 520 and tape drives 540 to bus 512, user interface adapter 522 for connecting keyboard 524, mouse 526, and/or other user interface devices such as a touch screen device (not shown) to bus 512, communication adapter 534 for connecting data processing system 513 to a data processing network, and display adapter 536 for connecting bus 512 to display device 538. CPU 510 may include other circuitry not shown herein, which will include circuitry commonly found within a microprocessor, e.g., execution unit, bus interface unit, arithmetic logic unit, etc. CPU 510 may also reside on a single integrated circuit.

Although the present invention and its advantages have been described in detail, it should be understood that various changes, substitutions and alterations can be made herein without departing from the spirit and scope of the invention as defined by the appended claims.

What is claimed is:

1. A method for altering properties of a surface, comprising the steps of:
providing a target surface for alteration; and
performing an implantation of nanoparticles into the target surface, wherein:
said implantation is performed with a bead-blasting process using carrier beads, such that the carrier beads strike the target surface; and
mixing said nanoparticles with said carrier beads before performing said implantation, such that said nanoparticles become physically attached to said carrier beads.

2. The method as recited in claim 1, further comprising:
a chemical reaction of said nanoparticles with said target surface upon said implantation.

3. The method as recited in claim 1, wherein said target surface after said implantation with said nanoparticles is used as a cathode in a field emission device to extract electrons.

4. The method as recited in claim 3, wherein said field emission device, is configured with a. cathodoluminescent anode to emit light as a result of an electric field between said cathode and said anode.

5. The method as recited in claim 1, wherein said implantation deforms said target surface.

6. The method as recited in claim 5, wherein said implantation plastically deforms said target surface.

7. The method as recited in claim 1, wherein said nanoparticles are physically attached to said carrier beads by van der Waals forces.

8. The method as recited in claim 1, wherein said nanoparticles comprise carbon nanotubes.

9. The method as recited in claim 1, wherein a portion of said carrier beads are not retained by said target surface after said implantation.

10. The method as recited in claim 1, wherein an adhesive coating is applied to said carrier beads before mixing with said nanoparticles.

11. The method as recited in claim 1, wherein the carrier beads comprise a material that transitions from a solid to a fluid at room temperature.

12. A method for altering surface properties of particles, comprising the steps of
providing a target surface;
mixing nanoparticles with said particles, such that said nanoparticles become physically attached to said particles; and
performing an implantation of said nanoparticles into the surface of said particles using a blasting process such. that said particles strike the target surface.

13. The method recited in claim 12, wherein the target surface is harder than said particles.

14. The method as recited in. claim 12, further comprising:
a chemical reaction of said nanoparticles with said particles upon said implantation.

15. The method as recited in claim 12, wherein:
the nanoparticles comprise alumina; and
the particles comprise a polymer.

16. The method as recited in claim 12, wherein said nanoparticles have a higher melting point than said particles.

17. The method as recited in claim 12, wherein said. particles are not retained by the target surface.

* * * * *